United States Patent
Kwak et al.

(10) Patent No.: US 10,152,948 B2
(45) Date of Patent: *Dec. 11, 2018

(54) INFORMATION DISPLAY APPARATUS HAVING AT LEAST TWO TOUCH SCREENS AND INFORMATION DISPLAY METHOD THEREOF

(71) Applicant: Samsung Electronics Co., Ltd., Gyeonggi-do (KR)

(72) Inventors: Ji-Yeon Kwak, Seoul (KR); Kyung-A Kang, Seoul (KR); Hyun-Jin Kim, Seoul (KR); Joon-Kyu Seo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,371

(22) Filed: Jan. 3, 2017

(65) Prior Publication Data

US 2017/0116965 A1 Apr. 27, 2017

Related U.S. Application Data

(63) Continuation of application No. 13/369,943, filed on Feb. 9, 2012, now Pat. No. 9,541,958.

(30) Foreign Application Priority Data

Jun. 20, 2011 (KR) .................. 10-2011-0059500

(51) Int. Cl.
*G06F 3/041* (2006.01)
*G09G 5/14* (2006.01)
(Continued)

(52) U.S. Cl.
CPC ............ *G09G 5/14* (2013.01); *G06F 1/1616* (2013.01); *G06F 1/1641* (2013.01);
(Continued)

(58) Field of Classification Search
CPC .... G06F 1/1616; G06F 1/1652; G06F 3/0488; G06F 1/1647
(Continued)

(56) References Cited

U.S. PATENT DOCUMENTS 6,396,506 B1 5/2002 Hoshino et al.
8,751,970 B2 6/2014 Hinckley
(Continued)

FOREIGN PATENT DOCUMENTS

CN 101833391 9/2010
CN 101853122 10/2010
(Continued)

OTHER PUBLICATIONS

Korean Office Action dated Nov. 10, 2017 issued in counterpart application No. 10-2012-0012426, 10 pages.
(Continued)

*Primary Examiner* — Adam J Snyder
(74) *Attorney, Agent, or Firm* — The Farrell Law Firm, P.C.

(57) ABSTRACT

A method and apparatus for displaying information on at least two touch screens are provided. The method includes sensing a first touch-drag on a first touch screen; sensing a first touch on a second touch screen; and displaying, on at least one of the first and second touch screens, information corresponding to the first touch-drag on the first touch screen and the touch on the second touch screen, if the touch-drag on the first touch screen and the first touch on the second touch screen are simultaneously sensed.

8 Claims, 14 Drawing Sheets

Related U.S. Application Data

(60) Provisional application No. 61/441,491, filed on Feb. 10, 2011.

(51) Int. Cl.
| | | |
|---|---|---|
| *G06F 1/16* | (2006.01) | |
| *G06F 3/0484* | (2013.01) | |
| *G06F 3/0485* | (2013.01) | |
| *G06F 3/0486* | (2013.01) | |
| *G06F 3/0488* | (2013.01) | |
| *G06F 3/14* | (2006.01) | |

(52) U.S. Cl.
CPC .......... *G06F 1/1643* (2013.01); *G06F 1/1647* (2013.01); *G06F 1/1649* (2013.01); *G06F 3/041* (2013.01); *G06F 3/0485* (2013.01); *G06F 3/0486* (2013.01); *G06F 3/04845* (2013.01); *G06F 3/04847* (2013.01); *G06F 3/04883* (2013.01); *G06F 3/04886* (2013.01); *G06F 3/1423* (2013.01); *G06F 2203/04102* (2013.01); *G06F 2203/04803* (2013.01); *G06F 2203/04806* (2013.01); *G06F 2203/04808* (2013.01); *G09G 2380/14* (2013.01)

(58) Field of Classification Search
USPC .................................................. 345/1.3, 173
See application file for complete search history.

(56) References Cited

U.S. PATENT DOCUMENTS

| | | | |
|---|---|---|---|
| 2002/0033795 | A1 | 3/2002 | Shahoian et al. |
| 2009/0244016 | A1 | 10/2009 | Casparian et al. |
| 2010/0060664 | A1* | 3/2010 | Kilpatrick, II ........ G06F 1/1616 345/1.3 |
| 2010/0066643 | A1 | 3/2010 | King et al. |
| 2010/0097338 | A1 | 4/2010 | Miyashita et al. |
| 2010/0123669 | A1 | 5/2010 | Chae et al. |
| 2010/0141607 | A1 | 6/2010 | Ryoo et al. |
| 2010/0164904 | A1 | 7/2010 | Kim et al. |
| 2010/0182265 | A1 | 7/2010 | Kim et al. |
| 2010/0188352 | A1 | 7/2010 | Ikeda |
| 2010/0245267 | A1 | 9/2010 | Min et al. |
| 2010/0283747 | A1 | 11/2010 | Kukulski |
| 2010/0309158 | A1 | 12/2010 | Iwayama et al. |
| 2011/0012921 | A1 | 1/2011 | Cholewin et al. |
| 2011/0018821 | A1 | 1/2011 | Kii |
| 2011/0157057 | A1 | 6/2011 | Hata |
| 2011/0209039 | A1 | 8/2011 | Hinckley |
| 2011/0209057 | A1 | 8/2011 | Hinckley |
| 2011/0209058 | A1 | 8/2011 | Hinckley |
| 2011/0209089 | A1 | 8/2011 | Hinckley |
| 2011/0209100 | A1 | 8/2011 | Hinckley |
| 2011/0209104 | A1 | 8/2011 | Hinckley |
| 2012/0007854 | A1 | 1/2012 | Cho |
| 2012/0084690 | A1 | 4/2012 | Sirpal et al. |
| 2012/0084735 | A1 | 4/2012 | Sirpal |
| 2012/0084736 | A1 | 4/2012 | Sirpal |
| 2012/0084737 | A1 | 4/2012 | Gimpl et al. |
| 2012/0084738 | A1 | 4/2012 | Sirpal |
| 2012/0127109 | A1 | 5/2012 | Nishio et al. |

FOREIGN PATENT DOCUMENTS

| | | |
|---|---|---|
| CN | 101866263 | 10/2010 |
| CN | 102141858 | 8/2011 |
| EP | 2 237 138 | 10/2010 |
| EP | 2 241 963 | 10/2010 |
| JP | 2010-250465 | 11/2010 |
| JP | 2010-286911 | 12/2010 |
| KR | 1020000064572 | 11/2000 |
| KR | 10-0887778 | 3/2009 |
| KR | 1020090106312 | 10/2009 |
| KR | 1020100064315 | 6/2010 |
| KR | 1020100078234 | 7/2010 |
| KR | 1020100082451 | 7/2010 |
| KR | 1020100093695 | 8/2010 |
| KR | 1020100099587 | 9/2010 |
| KR | 1020100104562 | 9/2010 |
| KR | 1020110005434 | 1/2011 |
| WO | WO 2011-013400 | 2/2011 |

OTHER PUBLICATIONS

Chinese Office Action dated Jun. 6, 2016 issued in counterpart application No. 201280017794.1, 22 pages.
Chinese Office Action dated Oct. 9, 2015 issued in counterpart application No. 201280017794.1, 21 pages.
Korean Office Action dated Jun. 28, 2017 issued in counterpart application No. 10-2011-0080024, 15 pages.
Korean Office Action dated Jul. 24, 2018 issued in counterpart application No. 10-2012-0066401, 7 pages.

* cited by examiner

INFORMATION DISPLAY APPARATUS HAVING AT LEAST TWO TOUCH SCREENS AND INFORMATION DISPLAY METHOD THEREOF

PRIORITY

This application is a Continuation Application of U.S. patent application Ser. No. 13/369,943, which was filed in the U.S. Patent & Trademark Office on Feb. 9, 2012, and claims priority under 35 U.S.C. § 119(a) to a U.S. Provisional Patent Application filed in the U.S. Patent and Trademark Office on Feb. 10, 2011 and assigned Ser. No. 61/441,491 and a Korean Patent Application filed in the Korean Intellectual Property Office on Jun. 20, 2011 and assigned Serial No. 10-2011-0059500, the contents of each of which are incorporated herein by reference.

BACKGROUND OF THE INVENTION

1. Field of the Invention

The present invention relates generally to an information display apparatus having at least two touch screens and an information display method thereof, and more particularly, to an information display apparatus for displaying information corresponding to a user's gesture on at least one of two touch screens and an information display method thereof

2. Description of the Related Art

Conventionally, a user controls information displayed on a touch screen in an information display apparatus having a single touch screen, using only one finger, for example, an index finger. Now, information display apparatuses having two touch screens have started to emerge in order to display more information and increase device portability.

However, it is inconvenient for a user to rapidly process information on touch screens using one finger in an information display apparatus with two touch screens. Accordingly, there exists a need for rapidly processing information according to a user's gestures made with different fingers on the left and right touch screen, respectively (such as, for example, a left thumb or index finger on a left touch screen and with a right thumb or index finger on a right touch screen).

SUMMARY OF THE INVENTION

An aspect of embodiments of the present invention is to address at least the problems and/or disadvantages and to provide at least the advantages described below. Accordingly, an aspect of embodiments of the present invention is to provide an information display apparatus having at least two touch screens, for rapidly displaying and processing information on the at least two touch screens, and an information display method thereof.

In accordance with an aspect of the present invention, a method for displaying information on a flexible touch screen includes receiving a first touch-drag input in a first direction on a first part of the flexible touch screen while receiving a second touch-drag input in a second direction on a second part of the flexible touch screen, displaying first objects indicating a first plurality of applications on the first part in response to the first touch-drag input, and displaying second objects indicating a second plurality of applications on the second part in response to the second touch-drag input, receiving a first input for selecting one object among the first objects displayed on the first part or a second input for selecting one object among the second objects displayed on the second part, and executing an application being indicated by the selected object on the first part or the second part, wherein, if an application is selected among the first plurality of applications on the first part, an image corresponding to the selected application among the first plurality of applications is displayed on the first part, and if an application is selected among the second plurality of applications on the second part, an image corresponding to the selected application among the second plurality of applications is displayed on the second part.

In accordance with another aspect of the present invention, there is provided an apparatus for displaying information, including a flexible touch screen configured to receive a first touch-drag input in a first direction on a first part of the flexible touch screen while receiving a second touch-drag input in a second direction on a second part of the flexible touch screen, and a processor configured to control the flexible touch screen to display first objects indicating a first plurality of applications on the first part in response to the first touch-drag input, and display second objects indicating a second plurality of applications on the second part in response to the second touch-drag input, wherein the flexible touch screen is further configured to receive a first input for selecting one object among the first objects displayed on the first part or a second input for selecting one object among the second objects displayed on the second part, wherein the processor is further configured to execute applications being indicated by the selected objects, and wherein, if an application is selected among the first plurality of applications on the first part, an image corresponding to the selected application among the first plurality of applications is displayed on the first part, and if an application is selected among the second plurality of applications on the second part, an image corresponding to the selected application among the second plurality of applications is displayed on the second part.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
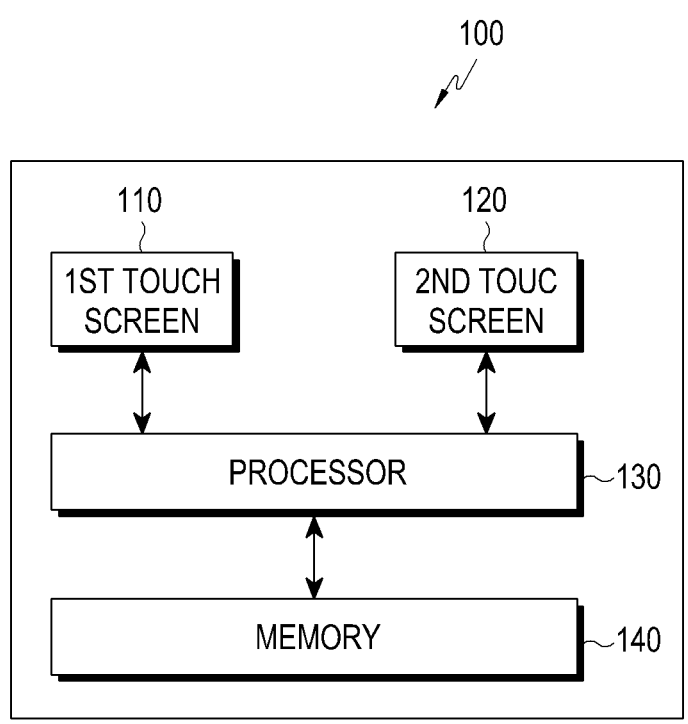
FIG. 1 is a block diagram of an information display apparatus according to an embodiment of the present invention.

Reference will now be made in detail to the preferred embodiments of the present invention with reference to the accompanying drawings. Like reference numerals denote the same components throughout the specification and the drawings. A detailed description of a generally known function and structure of the present invention will be avoided lest it should obscure the subject matter of the present invention. Throughout the drawings, the same drawing reference numerals may be understood to refer to the same or similar elements, features, and structures.

Herein, a user's gesture refers to a motion that a user makes in order to display or control information on a touch screen. The gestures may be performed using, but are not limited to, the user's left and right fingers, such as, index fingers and/or thumbs. Although the following examples refers to using fingers for various touch gestures for convenience of description, embodiments of the present invention are not limited to user touches initiated by a user's finger, and other ways of providing gestures to the touch screen, such as by a stylus, etc., may be used in accordance with embodiments of the present invention.

Examples herein refer to sensing "simultaneous" touch actions, such as simultaneous sensing of a touch drag and a touch or a first touch drag and a second touch drag. Throughout the application, simultaneous sensing or sensing of simultaneous touch actions includes cases where both touch actions are literally performed simultaneously, cases where one touch action occurs during another touch action, and cases where there is an overlap between the respective time periods of at least two touch actions. Such touch actions and sensing of such touch actions are considered to be simultaneous irrespective of which touch action is initiated first.

A user's gestures may include, for example, a touch, a touch release, a rotation, a pinch, a spread, a touch drag, etc. Among such gestures, a touch drag gesture is performed by touching a finger on a touch screen and then moving the finger to another position in a specific direction on the touch screen in a touched state. The touch drag gesture may include gestures such as a touch and drag, a flick, a swipe, etc. Herein, the term "touched state" refers to a touch on a touch screen or a very near approach onto the touch screen without actually touching the touch screen.

According to embodiments of the present invention, the information display apparatus may be any of a broad range of devices that display an application or content, such as a tablet Personal Computer (PC), a Portable Multimedia Player (PMP), a Personal Digital Assistant (PDA), a smart phone, a portable phone, and a digital photo frame.

FIG. 1 is a block diagram of an information display apparatus according to an embodiment of the present invention.

Referring to FIG. 1, an information display apparatus 100 may include a first touch screen 110, a second touch screen 120, a processor 130, and a memory 140.

Each of the touch screens 110 and 120 may include a display panel and a touch sensor (not shown). The display panel may be, for example, a Plasma Display Panel (PDP), an Electronic Paper Display (EPD) panel, a Liquid Crystal Display (LCD) panel, a Light emitting Polymer Display (LPD) panel, an Organic Light-Emitting Diode (OLED) panel, or an Active-matrix Organic Light-Emitting Diode (AMOLED) panel. The touch sensor may be provided at one side of the display panel, for sensing a user's gesture. The touch sensor may be implemented into a capacitive, resistive, infrared, or surface acoustic wave touch sensor.

Figure 2A:
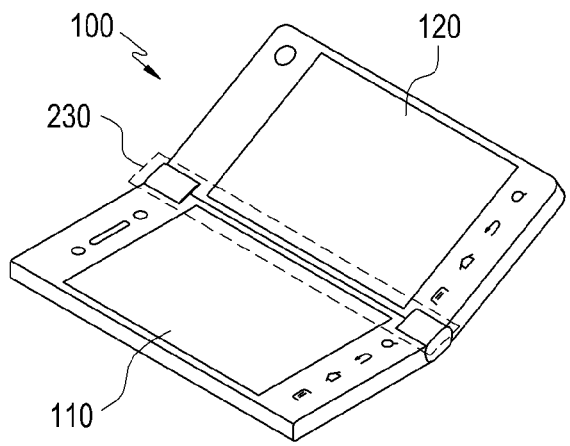
FIG. 2A is a diagram illustrating the information display apparatus according to the embodiment of the present invention.

FIG. 2A is a diagram illustrating the information display apparatus according to the embodiment of the present invention.

Referring to FIG. 2A, the first and second screens 110 and 120 may be folded or unfolded up to a predetermined angle with respect to a central axis 230. A hinge for connecting the first touch screen 110 to the second touch screen 120 or a part of a flexible screen may serve as the central axis 230.

Figure 2B:
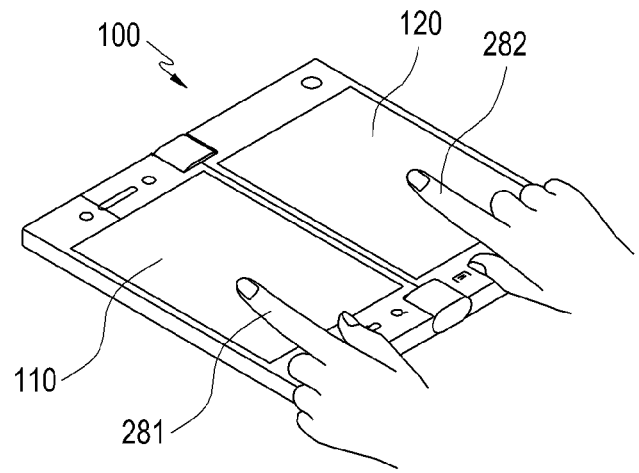
FIGS. 2B and 2C are diagrams illustrating the display apparatus along with fingers with which a user uses the information display apparatus according to the embodiment of the present invention.
Figure 2C:
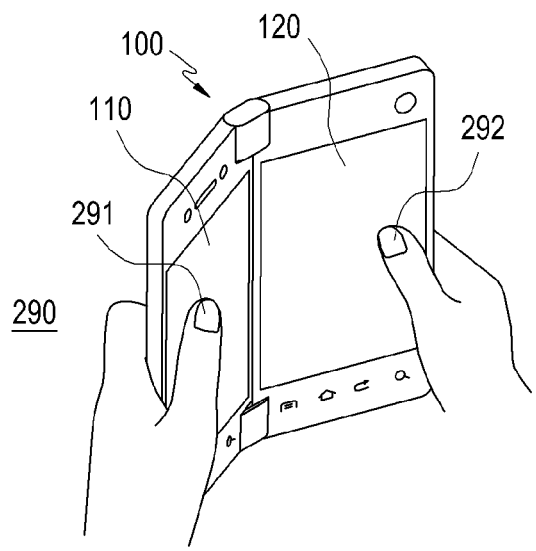

FIGS. 2B and 2C are diagrams illustrating the display apparatus along with fingers with which a user uses the information display apparatus according to the embodiment of the present invention.

Referring to FIG. 2B, a user may make gestures on the first and second touch screens 110 and 120 with his or her fingers (e.g., index fingers or thumbs). For instance, if the information display apparatus 100 is put on or set up to rest on a surface such as a desk, the user may make gestures on the first and second touch screens 110 and 120 using the user's left and right index fingers 281 and 282, as illustrated in FIG. 2B. Referring to FIG. 2C, the user may grab the information display apparatus 100 with his or her fingers and make gestures on the first and second touch screens 110 and 120 with his or her thumbs 291 and 292.

Referring to FIG. 1 again, at least one processor 130 and the memory 140 may be disposed under at least one of the touch screens 110 and 120.

The memory 140 may store programs required to implement various embodiments of the present invention, applications, content, and other various data. The memory 140 may include at least one of a volatile memory and a non-volatile memory. For example, the memory 140 may include a non-volatile memory such as a Read Only Memory (ROM), an Electrically Erasable and Programmable ROM (EEPROM), or a flash memory, for storing programs used for implementation of the present invention, and/or a Dynamic Random Access Memory (DRAM) or Static RAM (SRAM) for temporarily storing data to process information during power supply. In addition, at least a part of the memory 140 may be removable from the information display apparatus 100. For example, a Compact Flash (CF) card, a Secure Digital (SD) card, a Smart Media (SM) card, a MultiMedia Card (MMC), or a memory stick may be used as the removable part of the memory 140. The removable part (not shown) of the memory 140 may store various data, which may include downloaded from an external device.

The processor 130 provides overall control to the components of the information display apparatus 100. For example, methods for implementing certain operations according to various embodiments of the present invention may be implemented as programs stored in the memory 140 in conjunction with operations performed by hardware itself According to the present invention, the processor 130 or hardware of the information display apparatus 100 detects simultaneous occurrence of a first touch drag on the first touch screen 110 and a second touch on the second touch screen 120 and thus may display information corresponding to the first touch drag and the second touch on at least one of the first and second touch screens 110 and 120.

Figure 3:
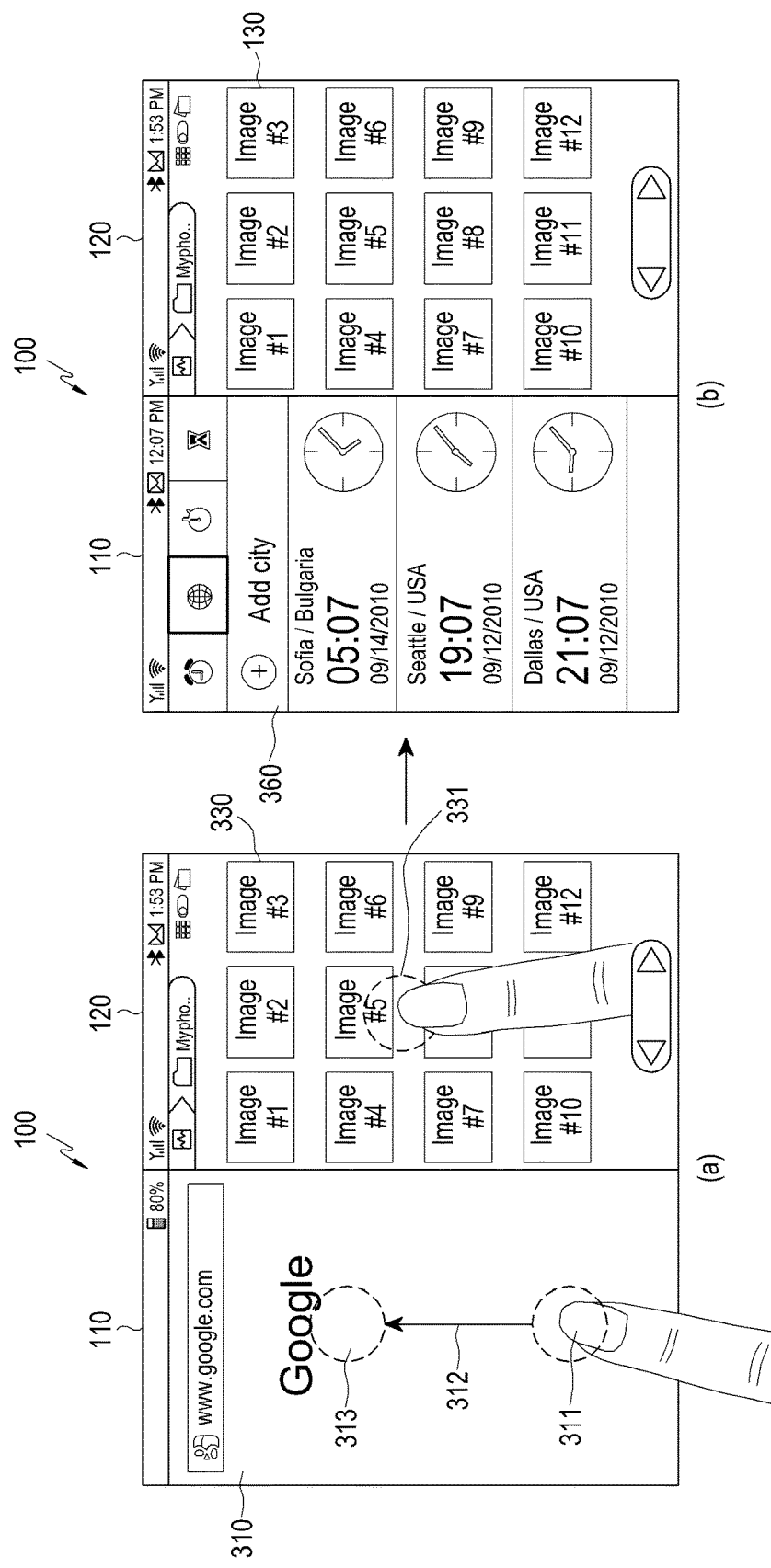
FIG. 3 is a diagram illustrating a user's gestures made on first and second screens according to an embodiment of the present invention.

FIG. 3 is a diagram illustrating a user's gestures made on first and second screens according to an embodiment of the present invention.

Referring to the left drawing (a) of FIG. 3, the information display apparatus 100 may display first information 310 on the first touch screen 110 and second information 330 on the second touch screen 120. The user may make a gesture on each of the first and second touch screens 110 and 120 based on the first and second information 310 and 330.

The information display apparatus 100 may sense a touch and upward drag (i.e., a first touch drag 312 on the first screen 110 and a second touch 331 on the second touch screen 120. The first touch drag 312 is performed by making a touch 311 on the first touch screen 110 and then dragging, along the direction indicated by reference numeral 312 to another position 313.

Upon simultaneously sensing the first touch drag 312 and the second touch 331, the information display apparatus 100 may display information corresponding to the first touch drag 312 and the second touch 331 on at least one of the first and second touch screens 110 and 120. Simultaneous sensing of the first touch drag 312 and the second touch 331 means sensing the first touch drag 312 made by a left index finger or thumb and the second touch 331 made by a right index finger or thumb irrespective of their order.

Referring to the right drawing (b) of FIG. 3, the information display apparatus 100 may display information 360 and 330 corresponding to the first touch drag 311, 312, and 313 and the second touch 331 on the first and second touch screens 110 and 120. For example, the information display apparatus 100 may display the information 360 other than the information 310 on the first touch screen 110, in correspondence with the first touch drag 311, 312, and 313, and may keep displaying the information 330 on the second touch screen 120, in correspondence with the second touch 331. For example, the information display apparatus 100 may display an application 360 other than an application 310 on the first touch screen 110, in correspondence with the first touch drag 311, 312, and 313 sensed from the first touch screen 120 and may maintain an application 330 displayed on the second touch screen 110, in correspondence with the second touch 331 sensed from the second touch screen 120.

Figure 4:
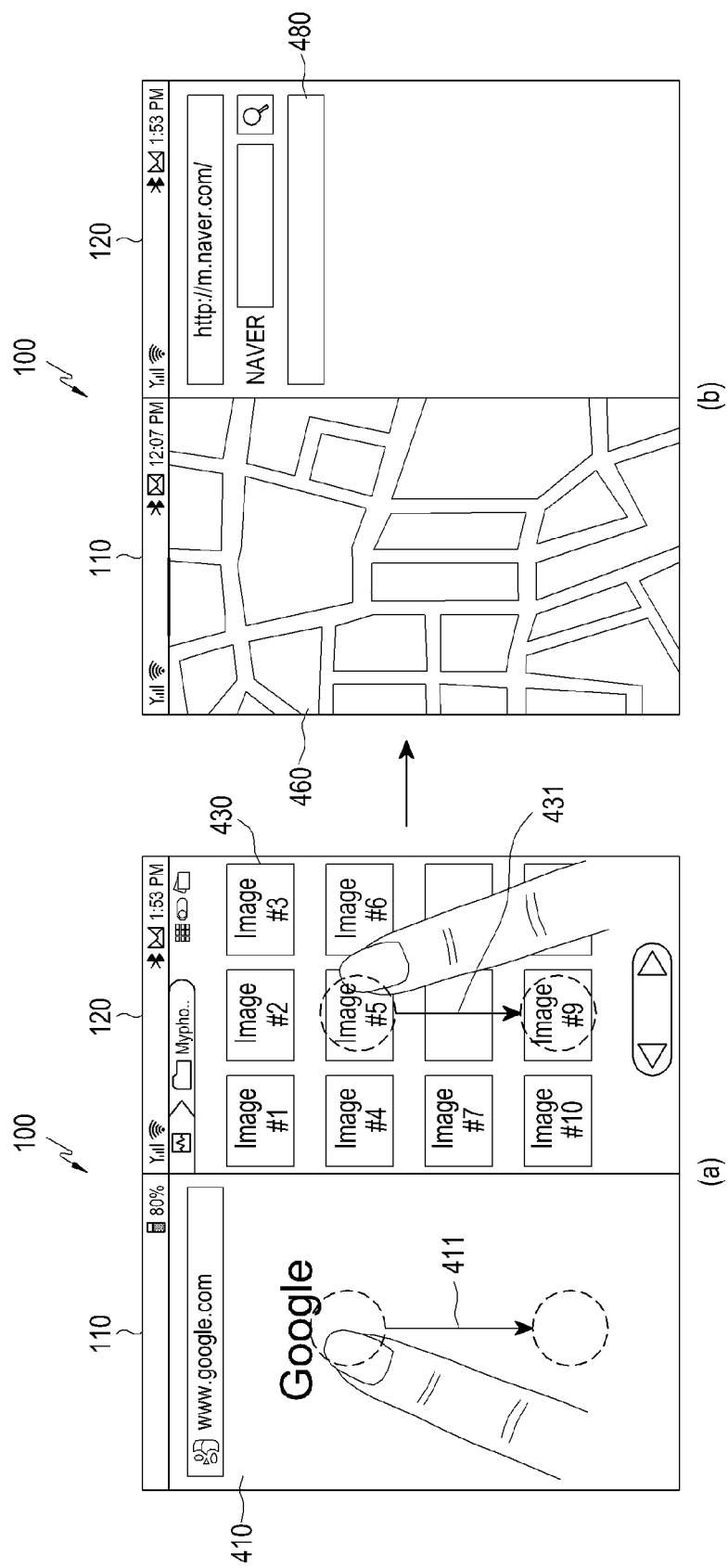
FIG. 4 is a diagram illustrating a user's gestures made on the first and second screens according to another embodiment of the present invention.

FIG. 4 is a diagram illustrating a user's gestures made on the first and second screens according to another embodiment of the present invention.

Referring to the left drawing (a) of FIG. 4, the information display apparatus 100 may simultaneously sense a downward first touch drag 411 on the first touch screen 110 and a downward second touch drag 431 on the second touch screen 120.

Referring to the right drawing (b) of FIG. 4, the information display apparatus 100 may display information 460 and 480 corresponding to the first touch drag 411 and the second touch drag 431, respectively, on the first and second touch screens 110 and 120. For example, upon sensing the first touch drag 411, the information display apparatus 100 may display an application 460 other than an application 410 on the first touch screen 110. Upon sensing the second touch drag 431, the information display apparatus 100 may display an application 480 other than an application 430 on the second touch screen 120.

Figure 5A:
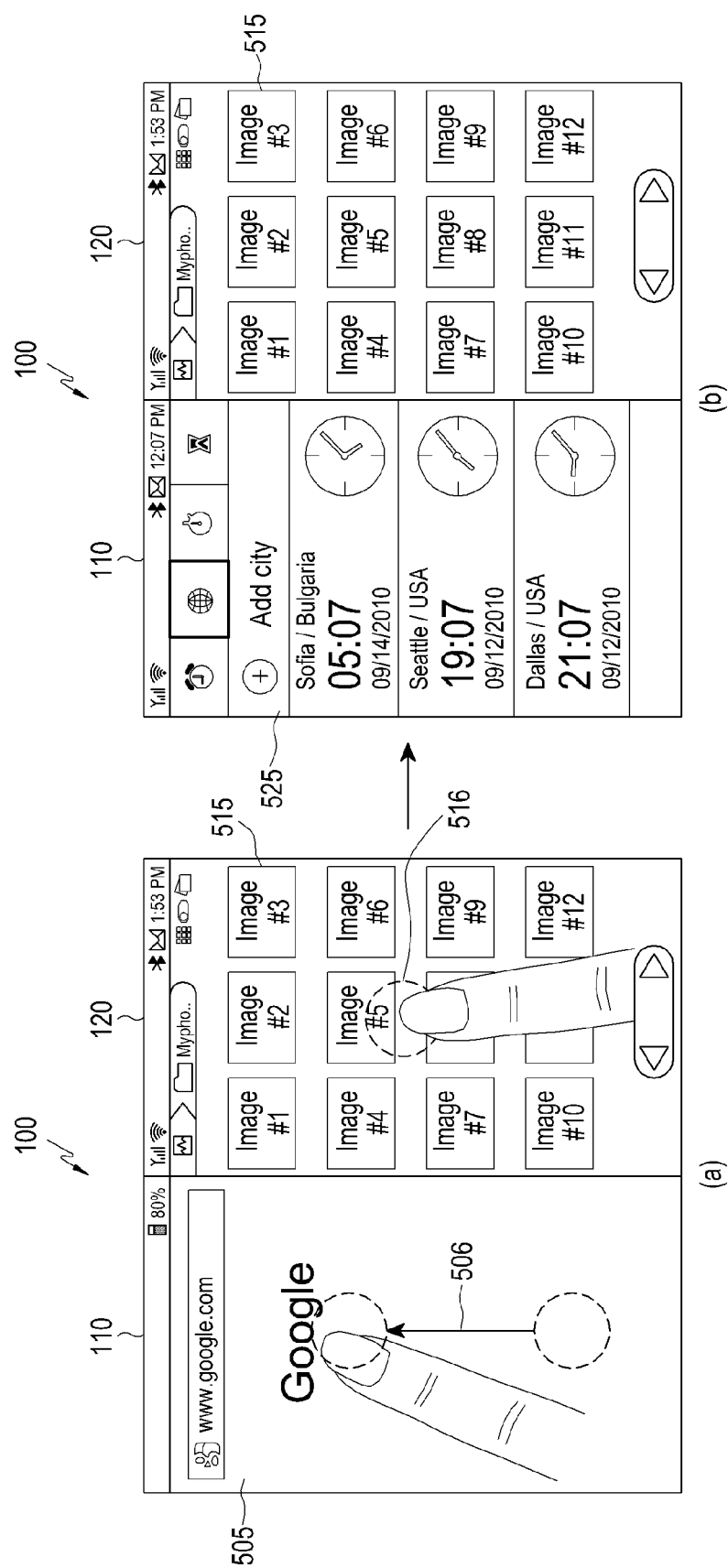
FIGS. 5A and 5B are diagrams illustrating a user's gestures made on the first and second screens according to another embodiment of the present invention.
Figure 5B:
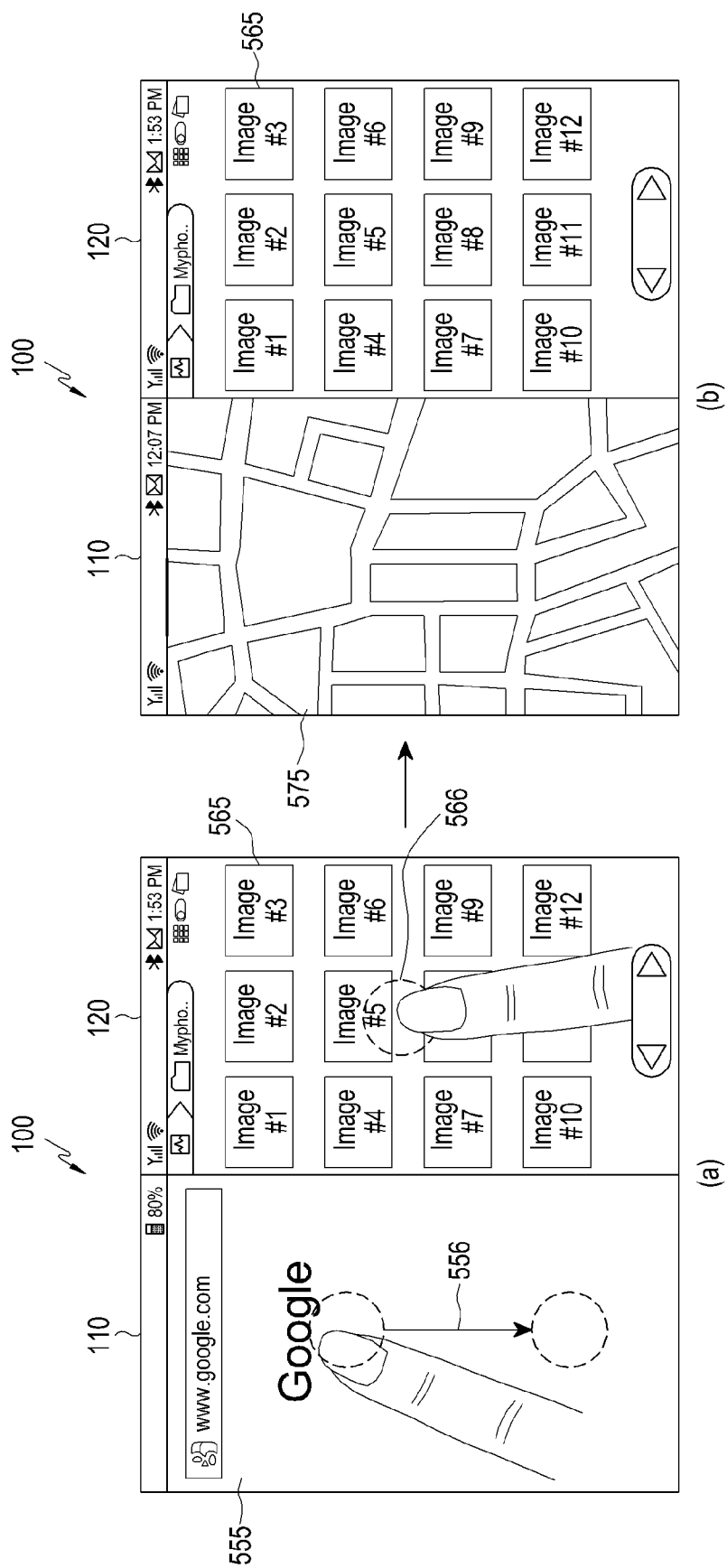

FIGS. 5A and 5B are diagrams illustrating a user's gestures made on the first and second screens according to another embodiment of the present invention.

Referring to the left drawing (a) of FIG. 5A, when the information display apparatus 100 senses an upward first touch drag 506 on the first touch screen 110 simultaneously with a second touch 516 on the second touch screen 120, the apparatus 100 may determine the dragging direction of the first touch drag 506 and thus may display information corresponding to the first drag 506 and the second touch 516 on at least one of the first and second touch screens 110 and 120 according to the dragging direction. For example, the information display apparatus 100 may sense that the touch and drag 506 has been made in a first direction (i.e. upward), as illustrated in the left drawing (a) of FIG. 5A.

The apparatus 100 may also sense that a touch drag 556 has been made in a second direction (i.e. downward), as illustrated in the left drawing (a) of FIG. 5B. If a plurality of pieces of information is arranged in a predetermined order (e.g., a plurality of applications having a predetermined order are being executed as the plurality of pieces of information), the information display apparatus 100 may sequentially display the plurality of pieces of information in the predetermined order according to the first or second direction. For example, referring to the right drawing (b) of FIG. 5A, the information display apparatus 100 may display information 525 earlier in sequence than information 505 on the first touch screen 110 according to the touch drag 506 made in the first direction, and may keep displaying information 515 on the second touch screen 120 according to the second touch 516.

In another example, referring to the right drawing (b) of FIG. 5B, the information display apparatus 100 may display information 575 next to information 555 on the first touch screen 110 according to the touch drag 556 made in the second direction, and may keep displaying information 565 on the second touch screen 120 according to a second touch 566.

Figure 6:
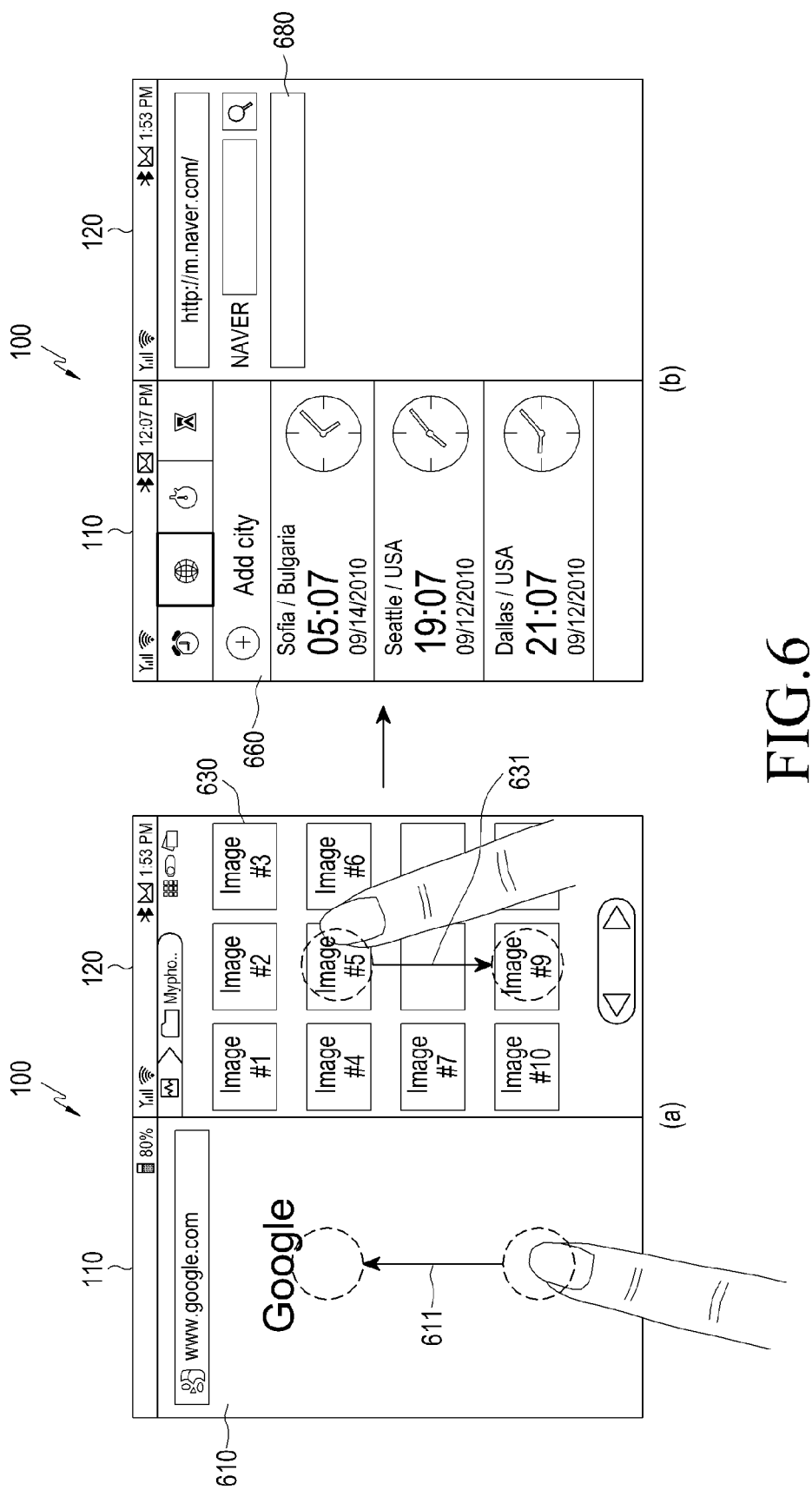
FIG. 6 is a diagram illustrating a user's gestures made on the first and second screens according to another embodiment of the present invention.

FIG. 6 is a diagram illustrating a user's gestures made on the first and second screens according to another embodiment of the present invention.

Referring to the left drawing (a) of FIG. 6, the information display apparatus 100 may simultaneously sense a first touch drag 611 made in a first direction on the first touch screen 110 and a second touch drag 631 made in a second direction on the second touch screen 120. As a result, the information display apparatus 100 may display first information 660 corresponding to the first touch drag 611 made in the first direction on the first touch screen 110 and second information 680 corresponding to the second touch drag 631 made in the second direction on the second touch screen 120, as illustrated in the right drawing (b) of FIG. 6. Each of the first and second information 660 and 670 may correspond to at least one of a plurality of applications being executed in the information display apparatus 100. For instance, if a plurality of applications are divided into first and second groups, information 610 and 660 displayed on the first touch screen 110 may be applications of the first group, whereas information 630 and 680 displayed on the second touch screen 120 may be applications of the second group.

Figure 7:
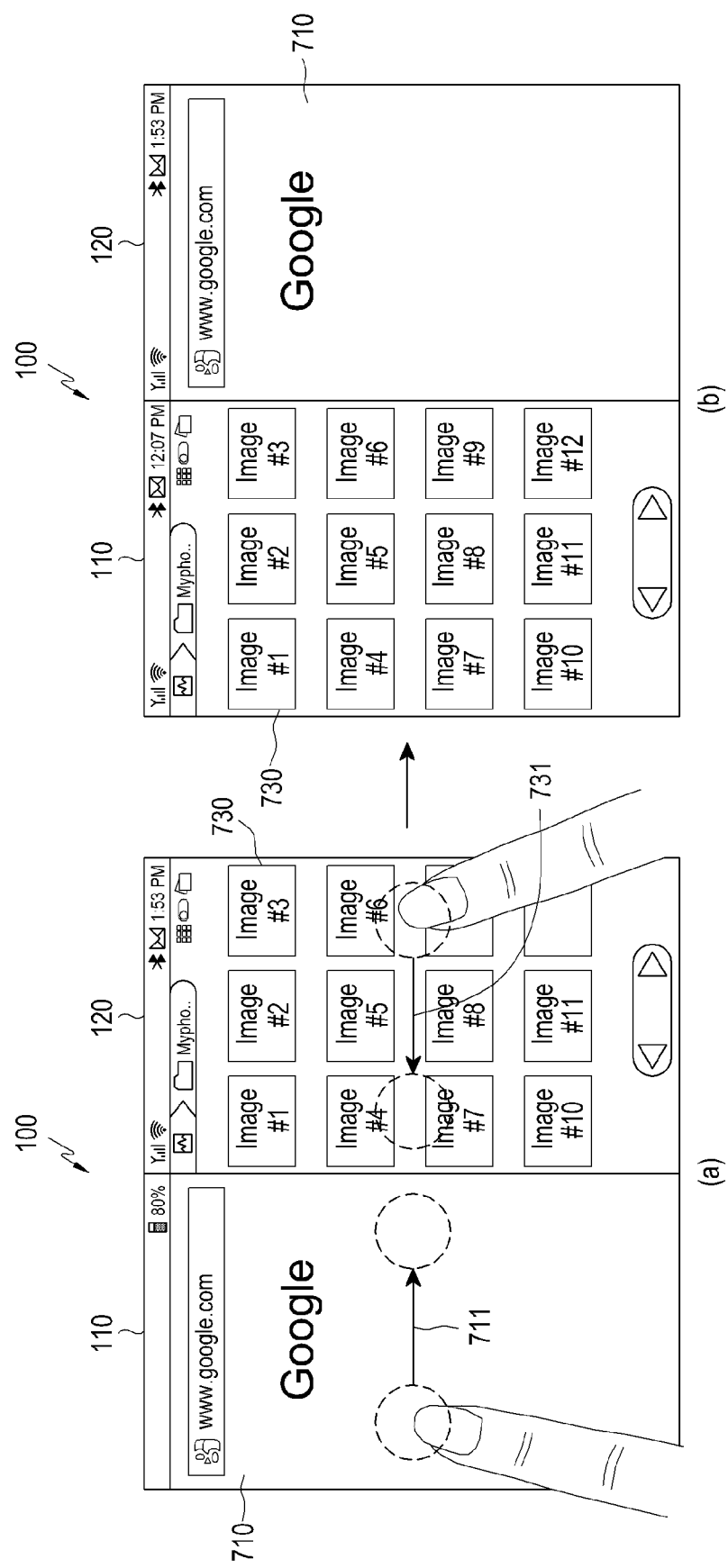
FIG. 7 is a diagram illustrating a user's gestures made on the first and second screens according to another embodiment of the present invention.

FIG. 7 is a diagram illustrating a user's gestures made on the first and second screens according to another embodiment of the present invention.

Referring to the left drawing (a) of FIG. 7, the information display apparatus 100 may simultaneously sense a first touch drag 711 made in a first direction on the first touch screen 110 and a second touch drag 731 made in a second direction on the second touch screen 120. The direction of the first touch drag 711 may be towards the second touch screen 120 (i.e., to the right), while the direction of the second touch drag 731 may towards the first touch screen 110 (i.e., to the left). Thus, the first and second directions may be mutually approaching directions.

Referring to the right drawing (a) of FIG. 7, the information display apparatus 100 may exchange information 710 displayed on the first touch screen 110 with information 730 displayed on the second touch screen 120 in accordance with the first touch drag 711 and the second touch drag 731. For example, the information display apparatus 100 may exchange the positions of an application 710 displayed on the first touch screen 110 and an application 730 displayed on the second touch screen 120. In other words, the information display apparatus 100 may display the application 730, which was previously displayed on the second touch screen 120, on the first touch screen 110, and may display the application 710, which was previously displayed on the first touch screen 110, on the second touch screen 120.

Figure 8:
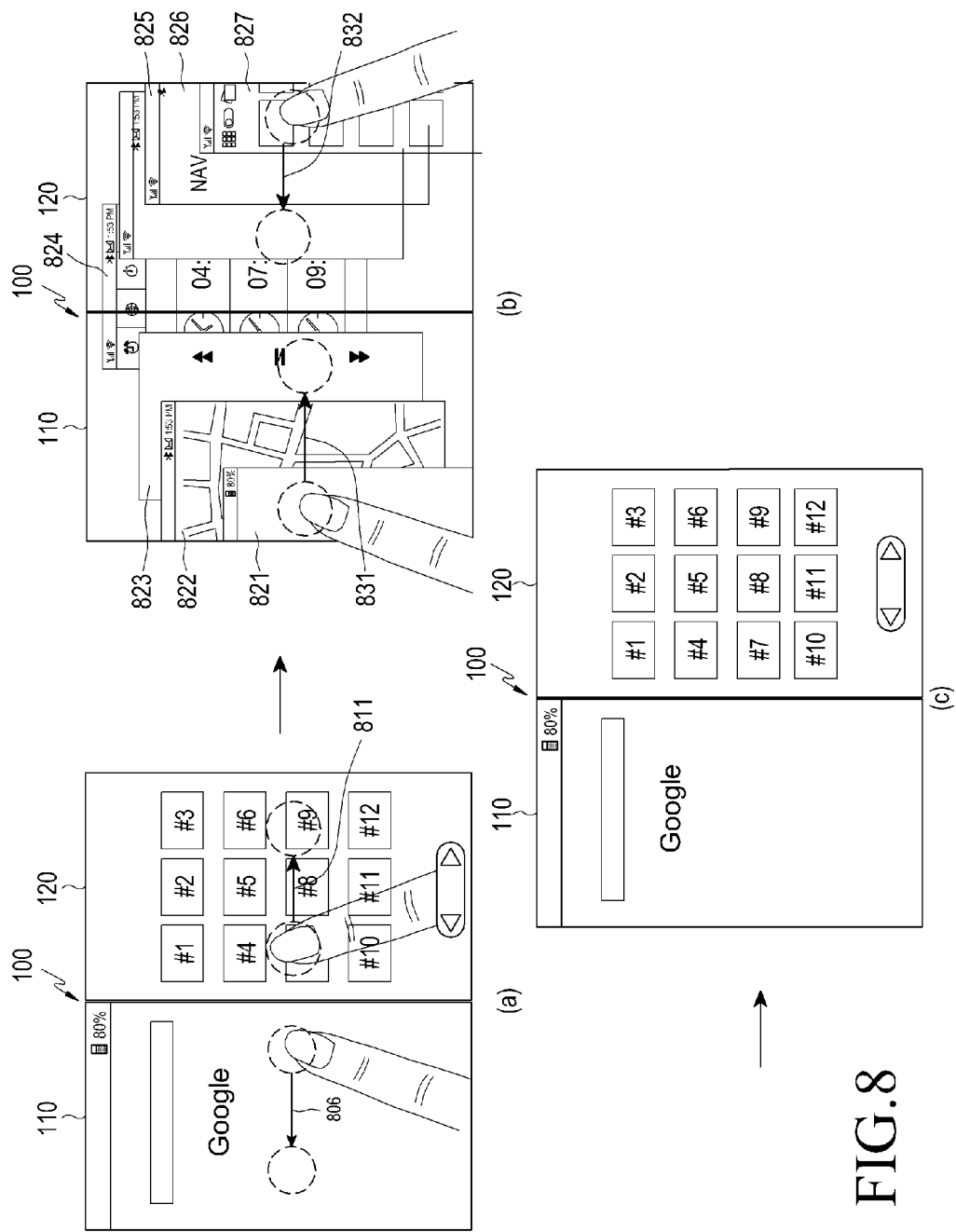
FIG. 8 is a diagram illustrating a user's gestures made on the first and second screens according to another embodiment of the present invention.

Referring to the upper left drawing (a) of FIG. 8, the information display apparatus 100 may simultaneously sense a first touch drag 806 made in a first direction on the first screen 110 and a second touch drag 811 made in a second direction on the second screen 120. The direction of the first touch drag 806 may be a direction moving away from the second touch screen 120, the direction of the second touch drag 806 may be a direction moving away from the first touch screen 110. Thus, the directions of the first and second touch drags 806 and 811 may mutually move away from each other.

FIG. 8 is a diagram illustrating a user's gestures made on the first and second screens according to another embodiment of the present invention.

Referring to the upper right drawing (b) of FIG. 8, the information display apparatus 100 may display all applications 821 to 827 available by a touch drag, in correspondence with the first touch drag 806 and the second touch drag 811, on at least one of the first and second touch screens 110 and 120.

A user may change the position of at least one of the applications 821 to 827 displayed on the first and second touch screens 110 and 120. For example, when the user touches one of the applications 821 to 827, the selected application may be moved to the forefront position. In addition, if a first application among the applications 821 to 827 is touched and dragged to a second application, the positions of the first and second applications may be exchanged.

Referring to the upper right drawing (b) of FIG. 8, with the plurality of applications 821 to 827 displayed on the first and second touch screens 110 and 120, the information display apparatus 100 may simultaneously sense a first touch drag 821 on the first touch screen 110, made in a direction towards the second touch screen 120 and a second touch drag 832 on the second touch screen 120, made in a direction towards the first touch screen 110. Upon simultaneously sensing the first and second touch drags 821 and 832 the information display apparatus 100 may fullscreen the forefront applications 821 and 827 from among the applications 821 to 827 on the first and second touch screens 110 and 120, respectively, in response to the first touch drag 831 and the second touch drag 832, such as shown in the lower drawing (c) of FIG. 8.

Figure 9A:
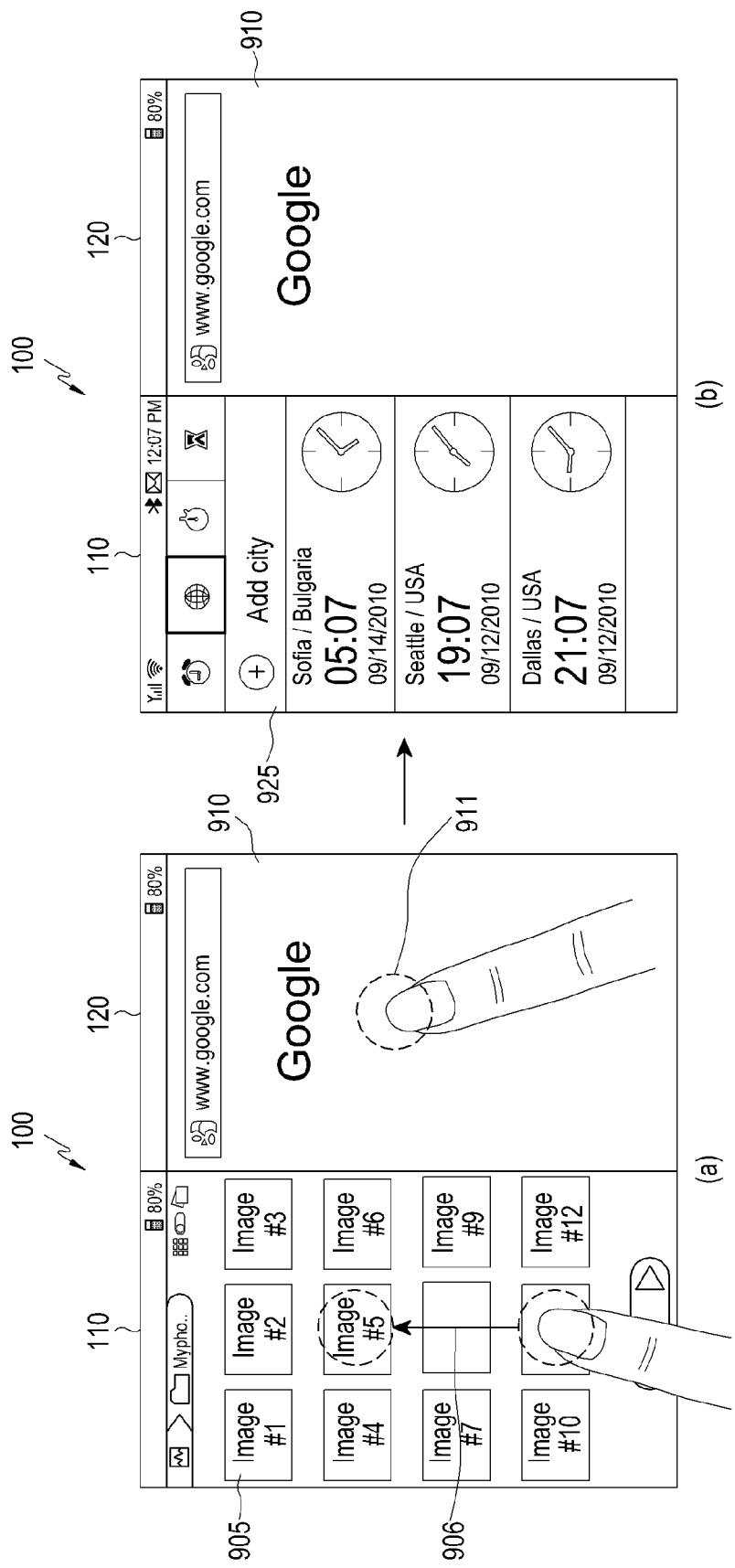
FIGS. 9A and 9B is a diagram illustrating a user's gestures made on the first and second screens according to another embodiment of the present invention.
Figure 9B:
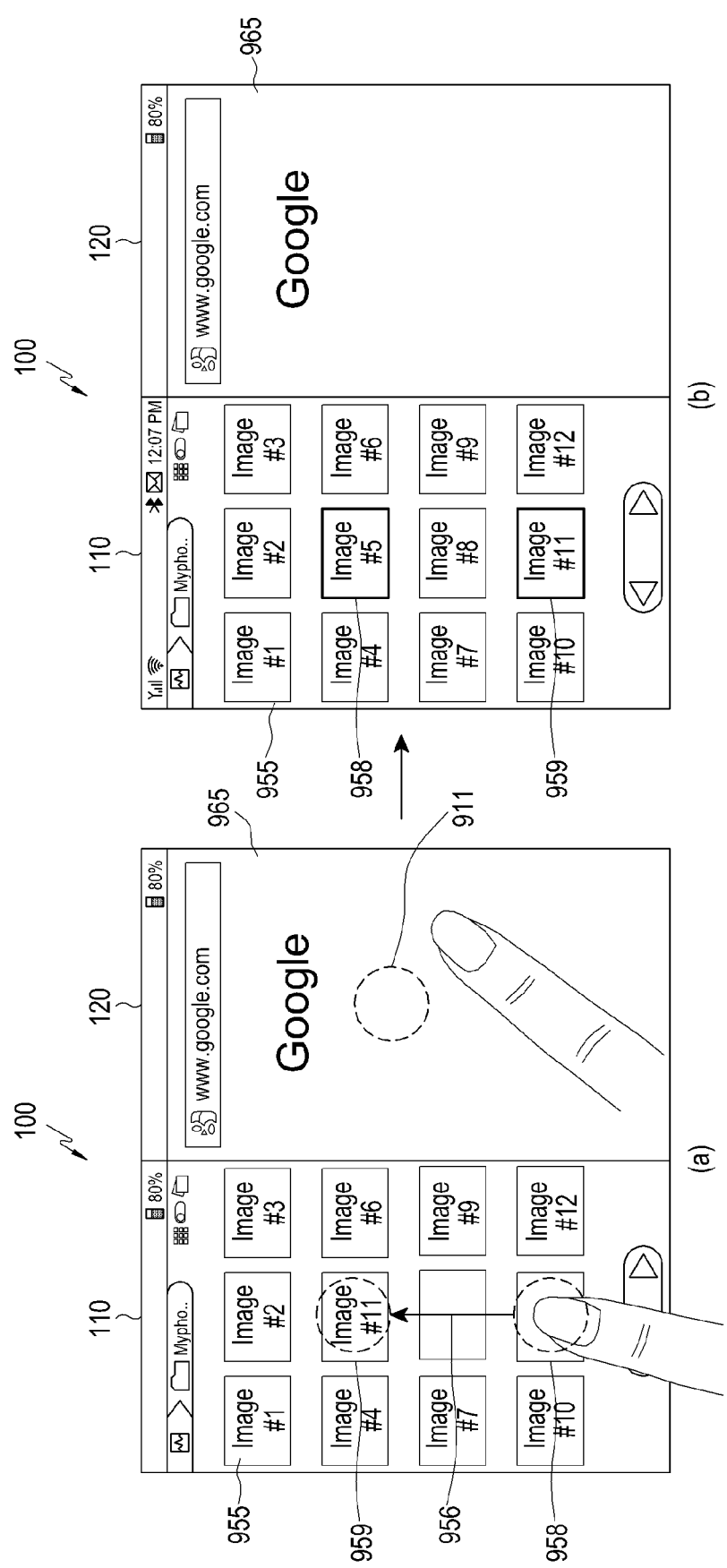

Referring to FIGS. 9A and 9B, the information display apparatus 100 may display information corresponding to a first touch drag 906 on the first touch screen 110 and a second touch 911 on the second touch screen 120, or may only display information corresponding to the first touch drag 906, depending on whether the information display apparatus 100 has simultaneously sensed the first touch drag 906 and the second touch 911.

FIGS. 9A and 9B is a diagram illustrating a user's gestures made on the first and second screens according to another embodiment of the present invention.

Referring to FIG. 9A, upon simultaneously sensing the first touch drag 906 and the second touch 911, the information display apparatus 100 may display, on the first touch screen 110, an application 925 other than an application 905 that displayed before the first touch drag 906 was sensed, according to the first touch drag 906. Meanwhile, the apparatus 100 may keep displaying, on the second touch screen 120, an application 910 that was displayed before the second touch 911 was sensed, according to the second touch 911.

Referring to FIG. 9B, if the information display apparatus 110 does not sense a first touch drag 956 and the second touch 911 at the same time (e.g. the second touch drag 911 and then the first touch drag 956 are sensed), it may change the position of content 958 in an application 955 displayed on the first touch screen 110, in correspondence with the first touch drag 956. For example, the information display apparatus 100 may exchange the position of content corresponding to the start of the first touch drag 956 with the position of content corresponding to the end of the first touch drag 956, in accordance with the first touch drag 956. That is, the information display apparatus 100 may move content 958 or exchange the positions of the content 958 and content 959.

Figure 10:
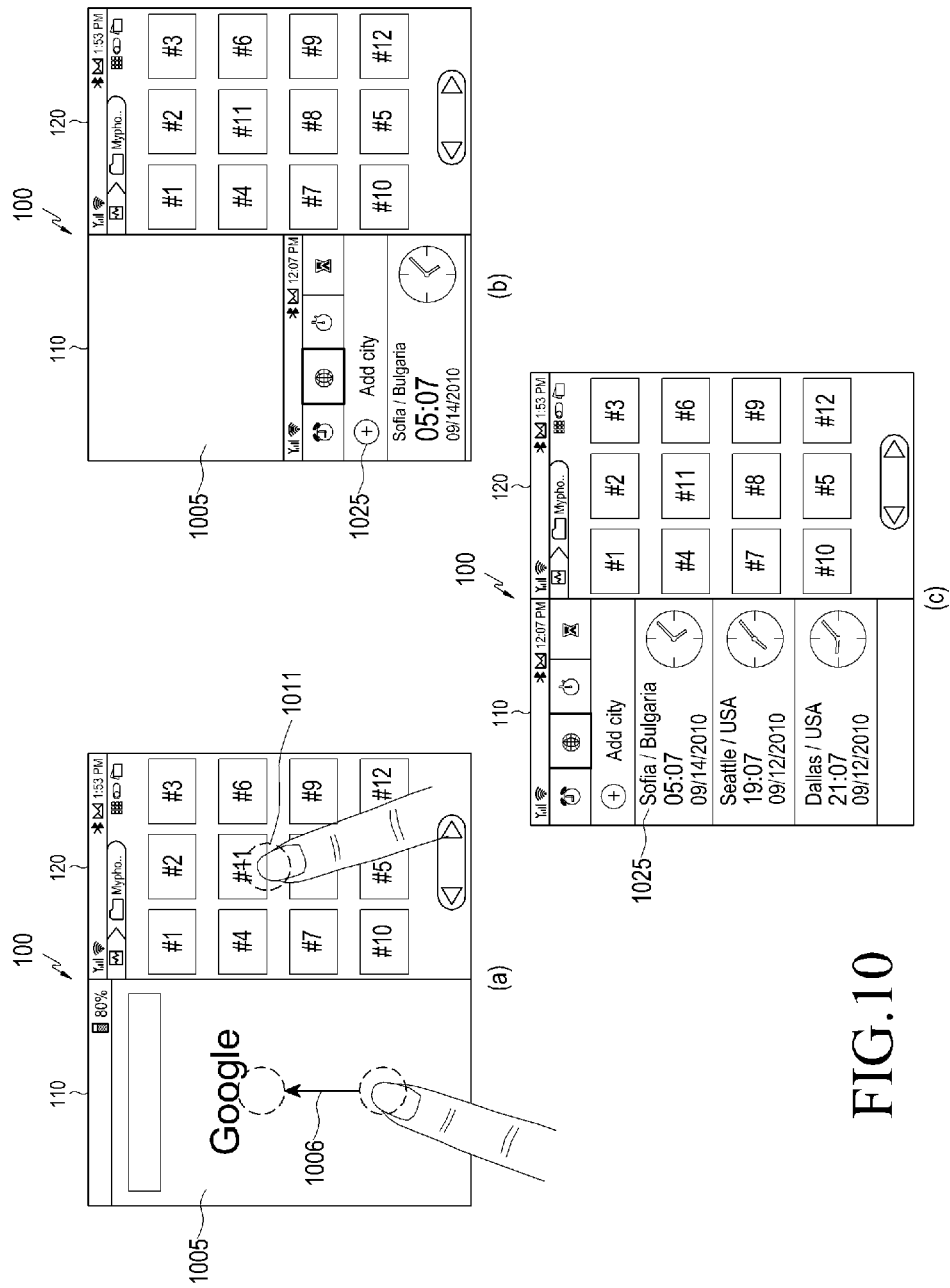
FIG. 10 is a diagram illustrating a user's gestures made on the first and second screens according to a further embodiment of the present invention.

FIG. 10 is a diagram illustrating a user's gestures made on the first and second screens according to a further embodiment of the present invention.

Referring to FIG. 10, upon sensing a first touch drag 1006 on the first touch screen 110 and a second touch 1011 on the second touch screen as shown in upper left drawing (a) of FIG. 10, the information display apparatus 100 may sequentially arrange existing information 1005 that was displayed before the first touch drag 1006 was sensed, and may also display information 1025 displayed after sensing the first touch drag 1006 as shown in the upper right drawing (b) of FIG. 10. For example, the information display apparatus 100 may display both the application 1005 that was already displayed before the first touch drag 1006 was sensed, as well as display the application 1025 after the first touch drag 1006 is sensed, on the first touch screen 110 during the first touch drag 1006 in progress. During the first touch drag 1006, the area over which the application 1005 is displayed on the first touch screen 110 may decrease, whereas the area over which the application 1025 is displayed may increase on the first touch screen 110. Upon completion of the first touch drag 1006, the first touch screen 110 may display only the application 1025 corresponding to the first touch drag 1006, such as illustrated in the lower drawing (c) of FIG. 10.

Figure 11:
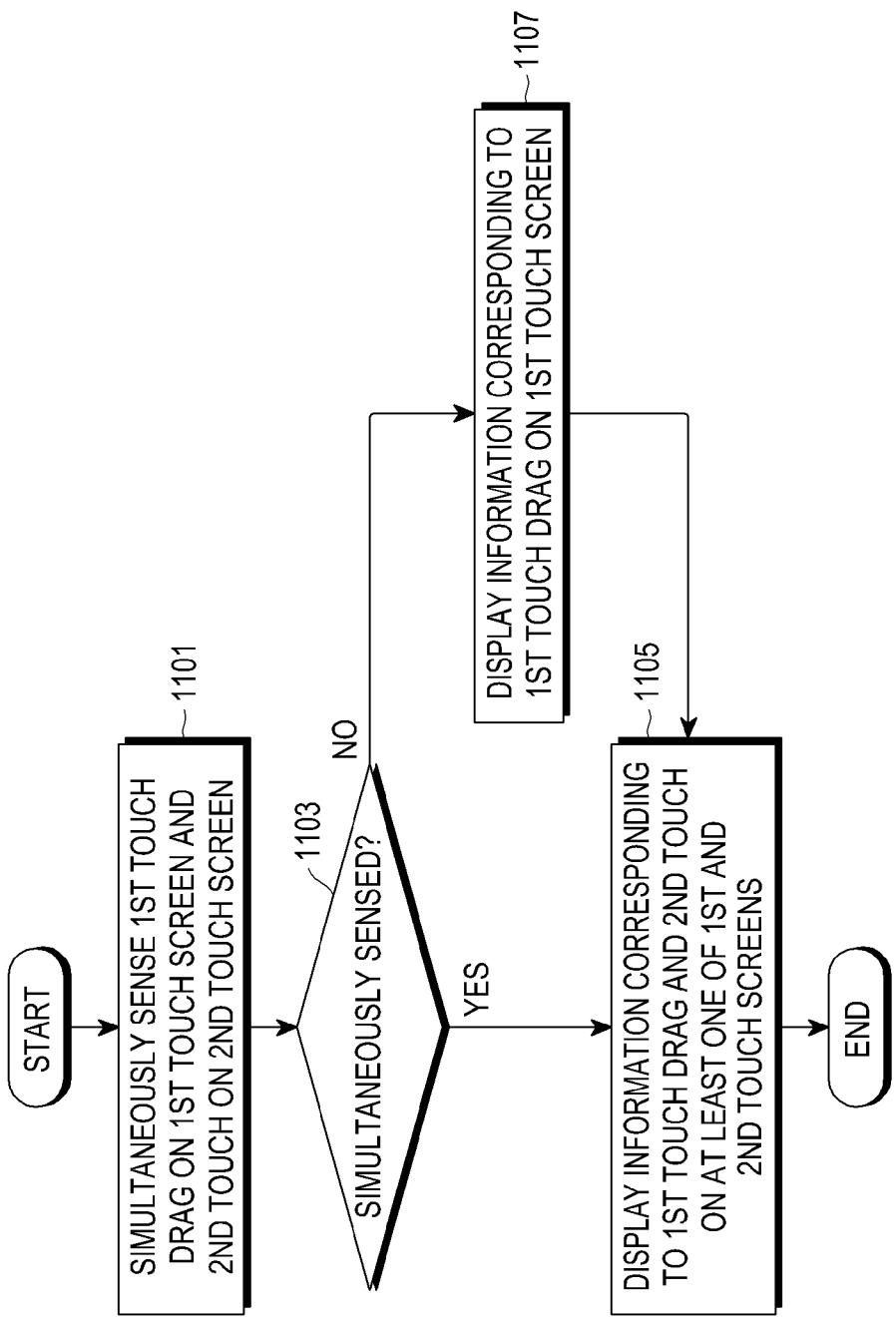
FIG. 11 is a flowchart illustrating an operation of the information display apparatus according to an embodiment of the present invention.

FIG. 11 is a flowchart illustrating an operation of the information display apparatus according to an embodiment of the present invention.

Referring to FIG. 11, the information display apparatus 100 may simultaneously sense a first touch drag on the first touch screen 110 and a second touch on the second touch screen 120 in step 1101. If the information display apparatus 100 has sensed the first touch drag and the second touch in step 1101, the information display apparatus 100 may determine whether the sensed first touch drag and the second touch are simultaneous in step 1103.

Upon a determination that the first touch drag and the second touch are simultaneously sensed, the information display apparatus 100 may display information corresponding to the first touch drag and the second touch on at least one of the first and second touch screens 110 and 120 in step 1105. For example, the information display apparatus 100 may display an application other than an existing application on the first touch screen 110, while maintaining an existing application on the second touch screen, such as illustrated in FIG. 9A.

However, if the first touch drag and the second touch are not sensed simultaneously, the information display apparatus 100 may display information corresponding to the first touch drag on the first touch screen 110 in step 1107. For instance, the information display apparatus 100 may change the position of content in an application displayed on the first touch screen 110, according to the first touch drag.

Figure 12:
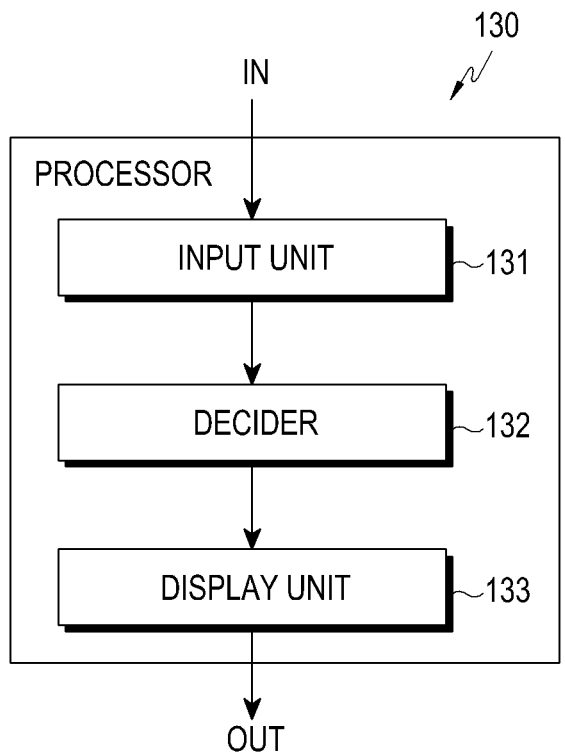
FIG. 12 is a block diagram of a processor in the information display apparatus according to an embodiment of the present invention.

FIG. 12 is a block diagram of a processor in the information display apparatus according to an embodiment of the present invention.

Referring to FIG. 12, the processor 130 may include an input unit 131, a decider 132, and a display unit 133.

The input unit 131 may receive a sensed signal corresponding to a first touch or a first touch drag sensed from the first touch screen 110, and may also receive a sensed signal corresponding to a second touch or a second touch drag sensed from the second touch screen 120.

The decider 132 may determine whether the first touch drag and the second touch have been sensed simultaneously, using the sensed signals received from the input unit 131.

If the first touch drag and the second touch have been sensed simultaneously, the display unit 133 may control display of information corresponding to the first touch drag and the second touch on at least one of the first and second touch screens 110 and 120. For example, the display unit 133 may control display of an application other than an already-displayed application on the first touch screen 110, while maintaining an already-displayed application on the second touch screen 120.

If a first touch drag and a second touch drag are sensed from the first and second touch screens 110 and 120, respectively through the input unit 131, the display unit 133 may control display of applications other than already-displayed applications on the first and second touch screens 110 and 120, in correspondence with the first touch drag and the second touch drag.

When displaying information corresponding to a first touch drag and a second touch, the display unit 133 may control display of one of a plurality of pieces of information on at least one of the first and second touch screens 110 and 120, according to a predetermined order.

In addition, the display unit 133 may control display of information displayed before sensing the first touch drag, together with and information to be displayed after sensing the first touch drag, during the first touch drag in progress.

Figure 13:
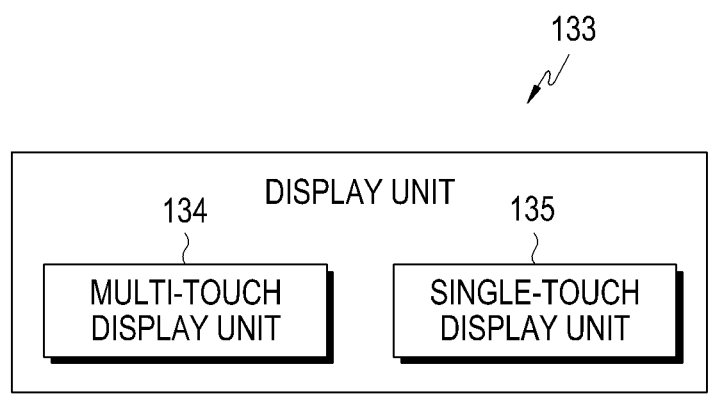
FIG. 13 is a block diagram of a display unit in the processor according to an embodiment of the present invention.

FIG. 13 is a block diagram of a display unit in the processor according to an embodiment of the present invention.

Referring to FIG. 13, the display unit 133 may include a multi-touch display unit 134 and a single-touch display unit 135.

When a first touch drag and a second touch are sensed simultaneously, the multi-touch display 134 may display information corresponding to the first touch drag and the second touch on the first touch screen 110. For example, the multi-touch display 134 may display an application other than an already-display application on the first touch screen 110, while maintaining an already-displayed application on the second touch screen 120.

When the first touch drag and the second touch are not sensed simultaneously, the single-touch display 135 may display information corresponding to the first touch drag on the first touch screen 110. For example, the single-touch display 135 may change the position of content in an application displayed on the first touch screen 110, in correspondence with the first touch drag.

As is apparent from the description of the present invention, a user can process information displayed on at least two touch screens, quickly and simultaneously. For example, the user may display a new application on at least one or each of the two touch screens without using an additional menu. In addition, the user may exchange applications between the two touch screens.

Certain aspects of the information display method in the information display apparatus according to the foregoing embodiments may be implemented as program commands that can be written to a computer-readable recording medium and can thus be read by various computer-aided means. Such a computer-readable recording medium may include program commands, a data file, a data structure, etc. alone or in combination. Program commands written on the computer-readable recording medium may be designed and configured specially for the present invention or known to those skilled in the art of computer software. Such a computer-readable recording medium may be any type of recording device in which data can be stored in a computer-readable manner. Examples of a computer-readable recording medium include a magnetic medium such as a hard disk, a floppy disk, and a magnetic tape, an optical medium such as a Compact Disc (CD)-Read Only Memory (ROM) or a Digital Versatile Disc (DVD), a magneto-optical medium such as a floptical disk, a hardware device configured specially to store and execute program commands such as a ROM, a Random Access Memory (RAM), and a flash memory. Examples of a program command include a high-level language code that can be executed in a computer by means of an interpreter as well as a machine language code such as created by a compiler. The hardware device may be configured to operate as one or more software modules to perform operations of the present invention, and vice versa.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method for displaying information on a flexible touch screen, the method comprising:
    receiving a first touch-drag input in a first direction on a first part of the flexible touch screen while receiving a second touch-drag input in a second direction on a second part of the flexible touch screen;
    displaying first objects indicating a first plurality of applications on the first part in response to the first touch-drag input, and displaying second objects indicating a second plurality of applications on the second part in response to the second touch-drag input;

receiving a first input for selecting one object among the first objects displayed on the first part or a second input for selecting one object among the second objects displayed on the second part; and executing an application being indicated by the selected object on the first part or the second part, wherein, if an application is selected among the first plurality of applications on the first part, an image corresponding to the selected application among the first plurality of applications is displayed on the first part, and if an application is selected among the second plurality of applications on the second part, an image corresponding to the selected application among the second plurality of applications is displayed on the second part.

2. The method of claim 1, wherein the flexible touch screen is foldable along a borderline between the first part and the second part.

3. The method of claim 1, wherein the first touch-drag input and the second touch-drag input are received irrespective of an order of receiving the first and second touch-drag inputs.

4. The method of claim 1, wherein the first direction and the second direction are opposite to each other.

5. An apparatus for displaying information, the apparatus comprising:

a flexible touch screen configured to receive a first touch-drag input in a first direction on a first part of the flexible touch screen while receiving a second touch-drag input in a second direction on a second part of the flexible touch screen; and a processor configured to control the flexible touch screen to display first objects indicating a first plurality of applications on the first part in response to the first touch-drag input, and display second objects indicating a second plurality of applications on the second part in response to the second touch-drag input, wherein the flexible touch screen is further configured to receive a first input for selecting one object among the first objects displayed on the first part or a second input for selecting one object among the second objects displayed on the second part, wherein the processor is further configured to execute applications being indicated by the selected objects, and wherein, if an application is selected among the first plurality of applications on the first part, an image corresponding to the selected application among the first plurality of applications is displayed on the first part, and if an application is selected among the second plurality of applications on the second part, an image corresponding to the selected application among the second plurality of applications is displayed on the second part.

6. The apparatus of claim 5, wherein the flexible touch screen is foldable along a borderline between the first part and the second part.

7. The apparatus of claim 5, wherein the flexible touch screen is configured to receive the first touch-drag input and the second touch-drag input irrespective of an order in which the first and second touch-drag inputs are received.

8. The apparatus of claim 5, wherein the first direction and the second direction are opposite to each other.

* * * * *